US008832322B2

(12) United States Patent
Junge et al.

(10) Patent No.: US 8,832,322 B2
(45) Date of Patent: Sep. 9, 2014

(54) ONLINE INDICATOR ADAPTER

(75) Inventors: Terry Junge, Scotts Valley, CA (US); Mark Thurman, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 92 days.

(21) Appl. No.: 13/355,423

(22) Filed: Jan. 20, 2012

(65) Prior Publication Data
US 2013/0191554 A1 Jul. 25, 2013

(51) Int. Cl.
*G06F 3/06* (2006.01)
*G06F 13/12* (2006.01)

(52) U.S. Cl.
USPC ............. 710/5; 710/2; 710/8; 710/15; 710/62

(58) Field of Classification Search
None
See application file for complete search history.

(56) References Cited

U.S. PATENT DOCUMENTS

| 8,209,441 | B1 | 6/2012 | Brockway et al. | |
|---|---|---|---|---|
| 2009/0144458 | A1* | 6/2009 | Rofougaran | 710/11 |
| 2011/0098000 | A1* | 4/2011 | Morris | 455/41.2 |
| 2013/0151875 | A1* | 6/2013 | Huynh | 713/310 |

OTHER PUBLICATIONS

U.S. Appl. No. 10/735,083. On-Line Status Detection for Host-Based Headset Applications. Filed Dec. 12, 2003.

* cited by examiner

*Primary Examiner* — Scott Sun

(74) *Attorney, Agent, or Firm* — Thomas L. Ewing

(57) ABSTRACT

A dongle adapter system is described that is configured to communicate in a first direction using a first communications protocol and to communicate in a second direction using a second communications protocol. Communications in the first direction employ a conventional communications protocol, such as the Universal Serial Bus ("USB") protocol. Communications in the second direction employs an Auxiliary Interface Bus ("AIB") protocol; in some embodiments, the employed AIB protocol may be proprietary. A translator associated with the dongle adapter translates communications between the first communications protocol and the second communications protocol. The dongle adapter allows a peripheral device organiclly configured for the second communications protocol to function without modification in computing networks whose communications operate on the first communications protocol.

20 Claims, 4 Drawing Sheets

ONLINE INDICATOR ADAPTER

FIELD

Embodiments of the invention relate to systems and methods for communications among the devices in a computerized network. More particularly, an embodiment of the invention relates to systems and methods that facilitate communications among various computer peripheral devices.

BACKGROUND

Unified communications represents an important aspect of productivity in contemporary business culture, and its success from company to company can serve as a bellwether indication of the company's overall management success. An essential feature behind unified communications is the ability to have a single way for reaching an employee. Thus, in a fully configured unified communications environment, all messages to an employee, regardless of the format of their origin (e.g., e-mail) will reach the employee at the earliest possible moment via another format (e.g., SMS) if necessary.

Unified communications may include the integration of real-time communication services (e.g., instant messaging) with non-real time communication services (e.g., SMS). Unified communications systems typically comprise not a single system but the integration of data from a potentially unlimited set of separate communications devices and systems.

As a further representative example, unified communications permit one party (e.g., a co-worker) to send a message on one medium and have it received by another party on another medium. This process effectively transfers an activity from one communications medium to another. For example, a message recipient could receive an e-mail message from a co-worker and access it through a mobile phone.

Presence information refers to the combination of the availability of a communication recipient to receive a message and that person's willingness to speak. For example, if the message sender is online according to the presence information and currently accepts calls, the response can be sent immediately through text chat or video call. Otherwise, the communication may be sent as a non real-time message that can be accessed through a variety of media. Thus, presence information typically represents a status indicator that conveys the availability and willingness of a potential communication partner.

Difficulties arise in producing a unified view of data, such as presence information, when a party's communication media are spread across multiple and/or overlapping systems. When a user's communications environment comprises multiple devices, not all of which are aware of the others, then the unity among the devices of the user's communications network is incomplete. So, for example, a party's laptop computer might not know about the same user's mobile telephone. Consequently, the mobile telephone is not joined into the same effective communications network as the other devices associated with the laptop computer, and a presence system cannot integrate the mobile phone into the unified communications environment.

Signaling a user's availability status to the coworkers in his immediate vicinity is also an important element in modern communications. It may matter little how sophisticated a presence system operates if the user's co-workers do not know that he is engaged in a conversation and interrupt him. For this reason, online indicators ("OLIs") have become popular. OLIs can take many forms, but the most common form is a lighted device that stands somewhere near the user's desk. When illuminated, the light signals that the user is engaged in a conversation, and when out, the light indicates the user's presence and potential availability for interruption.

Automatic phone lifters also provide critical support for modern communications. A phone lifter is a device configured to lift the physical handset on a conventional hard phone to engage a call. Lifters may provide their greatest benefits when operating in conjunction with headsets. This combination allows a user to answer or place a call using buttons associated with his headset (or computer) with corresponding actions mimicked by the manual lifter on the physical telephone.

Unified communications has analogs in the home consumer market. A home user may want to watch a television program, surf the Internet, or play a game uninterrupted. The home user may be able control devices (e.g., a wired telephone) associated with the home cable network to implement the desired message routing, but this home cable network has little control over interruptions coming from outside this equipment configuration.

Attempts to solve these problems in the prior art have tended to be either overly complicated, overly expensive, or both. To further complicate matters, many corporations now employ softphones in their corporate networks. Softphones are typically computer programs that facilitate audio and/or audiovisual conversations. For internal calls, softphones may operate over some form of local area network, such as an Ethernet. Softphones may even be configured to provide telephone communications outside the company such as via the Internet. Calls that arise outside the conventional hard phone installation on the user's workstation may not necessarily communicate with equipment associated only, or primarily, with the hard phone. Equipment falling into this category includes many conventional OLIs. A simple and robust solution is called for that makes unified communications more robust and ubiquitous and unites the elements of the user's communication system and its related equipment.

SUMMARY OF THE INVENTION

Embodiments of the invention provide a dongle adapter that comprises a first connection configured for communications using a first communications protocol, wherein the first connection is attachable to a computing device configured for communications according to the first communications protocol. The dongle adapter also comprises a second connection configured for communications using a second communications protocol, wherein the second connection is attachable to a peripheral device configured for communications according to the second communications protocol, and the dongle adapter further comprises a translator configured to receive commands from the computing device formatted according to the first communications protocol, translate the received commands into the second communications protocol and send the translated commands to the peripheral device. The translator is further configured to translate commands received from the peripheral device formatted according to the second communications protocol, translate the received commands into the first communications protocol, and send the translated commands to the computing device.

Embodiments of the invention comprise a dongle adapter that configures a first connection for communications using a first communications protocol, wherein the first connection is attached to a computing device configured for communications according to the first communications protocol. The dongle adapter further comprises configuring a second connection on the dongle adapter for communications using a second communications protocol, wherein the second connection is attached to a peripheral device configured for communications according to the second communications protocol. The dongle adaptor also comprises receiving commands in a translator associated with the dongle adapter from the computing device formatted according to the first communications protocol, translating the commands by the translator into the second communications protocol and sending the translated commands to the peripheral device. The translator also receives commands in the translator from the peripheral device formatted according to the second communications protocol, translates the received commands into the first communications protocol, and sends the translated commands to the computing device.

DETAILED DESCRIPTION OF AN EMBODIMENT OF THE INVENTION

Figure 1:
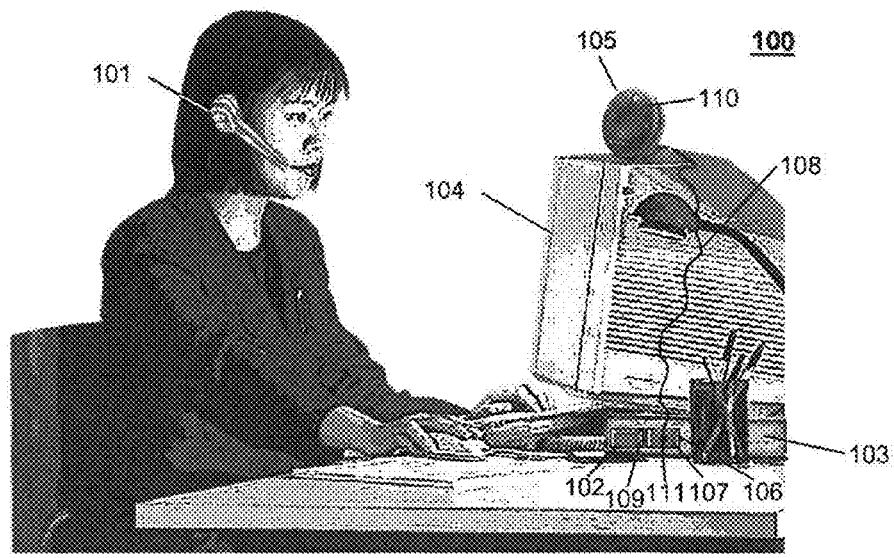
FIG. 1 illustrates a telephony workstation system 100, according to an embodiment of the invention.

Embodiments of the invention enable a conventional online indicator ("OLI") configured organically for communications in a first protocol to communicate with other devices in a computerized system, where the other devices have been configured for communication via a second communications protocol. For example, the computerized system may employ a well-known standard such as the Universal Serial Bus ("USB") for the communications among its peripheral devices while the OLI may communicate according to a different communications protocol, according to an embodiment of the invention. The OLI's communications protocol may be a proprietary one associated with its manufacturer, for example.

Conventional OLIs have often been designed to communicate using proprietary protocols. Consequently, these OLIs have limitations in terms of how readily they may integrate and communicate with other devices employed in the same workstation installation. A conventional OLI is typically plugged into a conventional telephone where the telephone has typically been manufactured to operate according to the same communications protocol as the OLI and where the protocol may even be a proprietary one with few or no open interfaces. In some conventional configurations, the light on a conventional OLI might not activate when other devices, such as a lifter, are not also employed. Thus, embodiments of the invention provide a solution to this problem by permitting a conventional OLI to be used in conjunction with devices operating on a different communications protocol, such as a USB headset and a conventional softphone application, without requiring modification of the conventional OLI.

USB is an industry standard that defines communications protocols, as well as the connectors and cables, used in a bus for communication (as well as connection and power supply) between computers and peripheral devices. USB has been used to standardize the connection of computer peripherals, such as keyboards, pointing devices, digital cameras, printers, portable media players, disk drives, and network adapters, as well as smartphones, PDAs and video game consoles.

Instead of using a well-known communications protocol such as USB, the OLI's organic communications protocol may employ an Accessory Interface Bus ("AIB"), according to an embodiment of the invention. The AIB provides similar functionality to a communications protocol like USB but just employs its protocol in a different manner. The AIB itself may constitute a proprietary protocol, such as the Plantronics Serial Bus ("PSB"), according to an embodiment of the invention. The PSB, like the USB protocol, is intended for controlling and monitoring many types of accessory devices, including those currently fielded as well as ones that may become available in the future which are configured for or easily adapted to coupling with the PSB. In some embodiments, the PSB provides a positive unregulated high voltage rail ($V_{dd}$) used as a power line for providing power to the accessories coupled to the PSB, a low voltage rail ($V_{ss}$) used as a ground line, and at least one signaling line for transferring communications. The signaling line may be a bi-directional signaling line; although, two or more signaling lines may be used, where each of these lines may be either unidirectional or bi-directional. Embodiments of the PSB operate as a multi-master type bus with unique addressing, wherein accessories connect to the PSB in parallel and are assigned a unique bus address. Embodiments of the PSB may employ a communications packet protocol for transmitting command/data back and forth over the PSB. Further information about an embodiment of the PSB may be found in U.S. Pat. No. 7,633,963, entitled "Accessory Interface Bus for Telephone Headset Adapter" co-owned with the present application by Plantronics, Inc., and which is hereby incorporated by reference.

Embodiments of the invention comprise a dongle adapter configured to communicate in a first direction using a first communications protocol, such as that of a conventional OLI that operates according to a specialized protocol, and to communicate in a second direction using a second communications protocol, such as USB. Thus, embodiments of the invention may employ proprietary communications software like the PSB for operation of the OLI while providing interoperability with various softphone clients using non-proprietary software.

A telephony workstation associated with an embodiment of the invention comprises a headset (wired or wireless), a softphone application, and an OLI. However, many other telecommunications devices could be used with the telephony workstation system. The headset may also include a headset adapter for USB communications if the headset has not been designed for USB communications, according to an embodiment of the invention. The workstation may also comprise additional equipment such as a conventional telephone and a handset lifter. The telephony workstation may be coupled to a communication network, such as the Ethernet, the Internet, and/or the Public Switched Telephone Network (PSTN).

FIG. 1 illustrates a telephony workstation system 100, according to an embodiment of the invention. A headset 101 is connected wirelessly to a computer 103. A headset adapter 102 connects to a port 109 (e.g., a port configured for USB communications) on the computer 103 and transmits commands and data between the headset 101 and the computer 103. The computer 103 includes a softphone application (such as the softphone application 208 shown in FIG. 2) that provides telephonic communications over a communications medium, such as an Ethernet, the Internet and/or the wired telephony network (e.g., the communications network 210 shown in FIG. 2). The computer 103 may also include other computing equipment, such as a monitor 104, and other conventional software applications. A suitable softphone application may comprise a specialized or proprietary telephony program and/or a generic softphone application such as Skype. The Microsoft Telephony Application Programming Interface (TAPI) provides a representative proprietary telephony program. TAPI is a Microsoft Windows application programming interface (API), which provides computer telephony integration and enables personal computers running Microsoft Windows to use telephone services. The headset adapter 102 may operate wirelessly, as shown in FIG. 1, or via a wired connection.

The workstation system 100 further includes an online indicator ("OLI") 105 configured to indicate when the user's headset 101 is engaged in a phone conversation provided by the softphone application on the computer 103, according to an embodiment of the invention. The OLI 105 lets others know when the user has engaged the headset 101 in a telephone conversation using a softphone application, such as the softphone application 208 shown in FIG. 2. A light 110 on the OLI 105 illuminates when the user has engaged the call and lets others know that the user is occupied with a telephony task. The user has placed the OLI 105 on her computer monitor 104 where the light 110 may be more visible to colleagues passing by her work area. Once her colleagues have been trained to pay attention to the light 110, they are less likely to disrupt her telephone calls. The OLI 105 is typically easy to use and may significantly reduce the number of calls that are interrupted.

The OLI 105 may operate according to a conventional design and provide an indication of online status via a number of mechanisms, such as by having lights that become illuminated when the user is on the telephone (e.g., the light 110 is illuminated). The lights may be configured to have different colors to indicate different communication statuses, and other means may be provided to indicate that the user is engaged and unavailable, according to embodiment of the invention. The OLI 105 shown in FIG. 1 has been designed to receive power and commands via a cord 108 connected to the computer 103. However, the OLI 105 could be designed to operate wirelessly and/or via another power source (e.g., battery power).

The OLI 105 communicates with the headset 101 via a dongle adapter 107, according to an embodiment of the invention. The dongle adapter 107 connects to a port 106 on the computer 103. The port 106 operates according to a communications protocol, such as USB, that is different from the communications protocol of the OLI 105. The dongle adapter 107 is also configured to receive the utility cord 108 from the OLI 105 at a connection 111, according to an embodiment of the invention. The dongle adapter 107 translates commands formatted for communications via the port 106 (e.g., the USB protocol) into commands associated with the protocol of the OLI 105 (e.g., such as an AIB, which may be a proprietary protocol like the PSB). Similarly, the dongle adapter 107 also translates commands formatted in the communications protocol employed by the OLI 105 into commands formatted according to the communications protocol used at the port 106. Thus, the OLI 105 itself may be of a conventional design that communicates only via a specialized AIB protocol yet still sends and receives communications from the computer 103 because of the presence of the dongle adapter 107, according to an embodiment of the invention. The dongle adapter 107 may be configured for operations with accessory devices beyond the OLI 105, according to an alternative embodiment of the invention.

Figure 2:
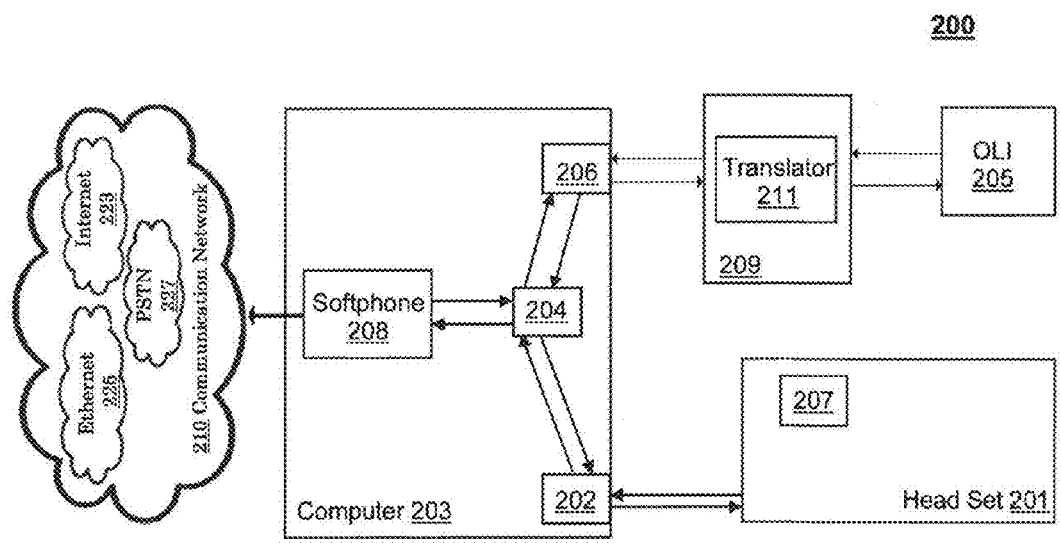
FIG. 2 illustrates a telephony workstation system 200, according to an embodiment of the invention.

FIG. 2 illustrates a telephony workstation system 200, according to an embodiment of the invention. The system 200 comprises a computer 203 having a softphone application 208. The softphone application 208 provides telecommunication services over a communications network 210 having communications types such as an Ethernet 225, the Internet 223, or the Public Switched Telephone Network (PSTN) 227. The softphone application 208 may be of a conventional design, according to an embodiment of the invention. As discussed above, Skype and MS TAPI are representative softphone applications, according to embodiments of the invention.

The softphone application 208 sends and receives communications that travel along a computer bus 204 and some of these communications may be routed through ports 202 and 206. As shown in FIG. 2, the port 202 is associated with a headset 201, and the port 206 is associated with a dongle adapter 209, according to an embodiment of the invention. The bus 204 operates as a conventional computer bus, and the protocols associated with the ports 202 and 206 are compatible with the computer's busing protocol, e.g., the ports 202 and 206 are configured to operate according to the USB protocol. Additional communications beyond those of the software application 208 may transpire over the bus 204 and may involve the ports 202 and 206, as appropriate. For example, communications between the headset 201 and the computer 203 may provide the headset 201 with a source of power. The dongle adapter 209 may also be configured to request power from the computer 203 via the bus 204 for the adapter's own operations and/or for an OLI 205, according to an embodiment of the invention.

The telephony workstation system 200 includes the headset 201 that may communicate with the softphone application 208, such as when the user is engaged in a phone conversation. The headset 201 communicates through the port 202 using a conventional protocol (e.g., USB). The headset 201 may operate internally in a proprietary communications protocol. As shown in FIG. 2, a translator 207 may accept internal communications from the headset 201 and translate them into a protocol acceptable for transmission through the port 202, according to an embodiment of the invention. The translator is likely not needed if the headset 201 has been designed to communicate according to the same protocol as the port 202. Whether or not the headset 201 includes a translator (e.g., the translator 207), the headset 201 communicates with the softphone application 208 via the port 202, according to an embodiment of the invention. The headset 201 may connect directly into the port 202, as shown in FIG. 2, or may communicate with the port 202 via a dongle, such as the headset adaptor 102 shown in FIG. 1.

The telephony workstation system 200 includes the OLI 205. The OLI 205 may be of a conventional design, and the OLI 205 may be configured only for communications in a proprietary protocol (e.g., the PSB). A dongle adapter 209 includes a translator 211 configured to accept commands in the proprietary communications language of the OLI 205 and translate them into a communications protocol suitable for transmission to the port 206 (e.g., the USB protocol), according to an embodiment of the invention.

The translator 211 may employ the Human Interface Device (HID) Class USB protocol in communications between the telephony workstation 200 and the OLI 205, according to an embodiment of the invention. The translator 211 may convert commands received from the telephony workstation 200 formatted in the USB HID protocol into commands and protocols utilized by the AIB protocol, e.g., the PSB. The translator 211 may also convert various status and event messages utilized by the AIB protocol (e.g., the PSB) into HID protocol status and event messages and post these messages to the telephony workstation 200, according to an embodiment of the invention.

Using the telephony workstation system 200, a communication could originate from the headset 201 in the AIB protocol, be translated into the USB protocol by the translator 207 and sent to the computer 203 where it ultimately is received by the dongle adapter 209 and translated by the translator 211 back into the AIB protocol, according to an embodiment of the invention. Similarly, messages could be communicated through the softphone 208 to the OLI 205 and vice versa.

In the telephony workstation system 200, for example, a message could be transmitted from the headset 201—or from the softphone 208—that the user was engaged in a phone conversation and accordingly, a light in the OLI 205 should be illuminated (e.g., the light 110 shown in FIG. 1), according to an embodiment of the invention. One exemplary communications sequence would have a call-related signal going from the softphone 208 to the headset 201 via the bus 204 and the port 202 and then having the headset 201 send a signal via the port 202, the bus 204, and the port 206 to the dongle 209 that instructed the OLI 205 to turn on its light, according to an embodiment of the invention.

The OLI 205 may not typically be configured to light automatically when audio is being provided to the headset 201 from a non-telephonic source, such as streaming media, according to an embodiment of the invention. The OLI 205 could be configured for manual lighting in such non-telephonic situations, according to an embodiment of the invention. The manual lighting could be engaged externally to the OLI 205, such as from the headset 201, according to an embodiment of the invention.

Figure 3A:
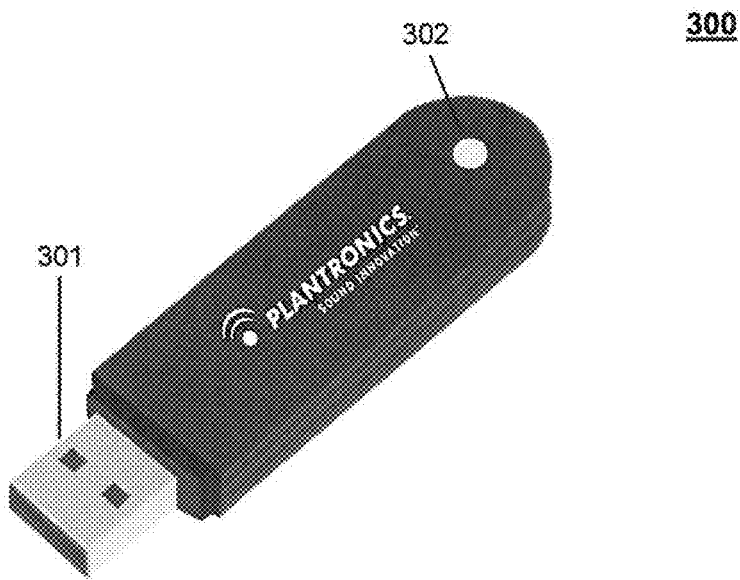
FIG. 3A illustrates a dongle adapter 300, according to an embodiment of the invention.
Figure 3B:
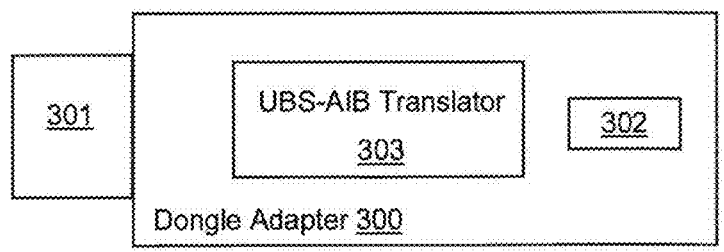
FIG. 3B provides a block diagram of the dongle adapter 300, according to an embodiment of the invention.

FIG. 3A illustrates a dongle adapter 300, according to an embodiment of the invention. The dongle adapter 300 comprises a connection 302 adapted for connection with an OLI, such as the OLI 105 shown in FIG. 1. The dongle adapter 300 also comprises a connection 301 suitable for insertion into a conventional communications port (e.g., a USB port) on a computer or other computing device (such as the USB port 206 shown in FIG. 2), according to an embodiment of the invention. The connection 301 may comprise, for example, a USB 2.0 Standard-A type plug having a flattened rectangle which inserts into a port receptacle on the USB host of a computing device, according to an embodiment of the invention. Embodiments of the invention may be configured to operate with conventionally adapted equipment such as a conventional OLI that does not require physical modification. As shown in FIG. 3B, translation of communications between the connection 301 and the connection 302 are performed by a translator (e.g., the translator 303 shown in FIG. 3B), according to an embodiment of the invention.

Assume for example that a conventional standalone OLI, such as the OLI 105 shown in FIG. 1 has a 3.5 mm jack (or plug). This size may have been selected for interoperability with other proprietary equipment by the manufacturer of the OLI, for example. Thus, the connection 302 would be configured to accept a 3.5 mm jack. For example, the dongle adapter 300 may comprise a standalone OLI adapter with a 3.5 mm jack configured to connect with conventional Plantronics Online Indicators (using Plantronics serial bus) and also configured to plug into a conventional USB port, according to an embodiment of the invention. In an alternative embodiment of the invention, a headset adapter could be configured to accept both a headset and an OLI, according to an alternative embodiment of the invention.

FIG. 3B provides a block diagram of the dongle adapter 300, according to an embodiment of the invention. The dongle adapter 300 comprises a USB-AIB translator 303 configured to translate a communication from the USB protocol to an accessory interface bus (AIB) busing protocol associated with an OLI, such as the OLI 105, according to an embodiment of the invention. The translator 303 could be configured to translate different protocols. The dongle adapter 300 further comprises the connection 302 configured to receive a connection (e.g., a plug or jack) from an online indicator, such as the online indicator 105 shown in FIG. 1. The dongle adapter 300 further includes the USB connection 301 configured to transmit communications to a USB port, such as the port 206 shown in FIG. 2.

The translator 303 may employ the Human Interface Device (HID) Class USB protocol in communications transpiring over the USB connection 301, according to an embodiment of the invention. The translator 303 may convert commands received over the connection 301 formatted in the USB HID protocol into commands and protocols utilized by the AIB protocol (e.g., the PSB) and transmitted over the connection 302. The translator 303 may also convert various status and event messages utilized by the AIB protocol (e.g., the PSB) into HID protocol status and event messages and post these messages over the connection 301, according to an embodiment of the invention.

Figure 4:
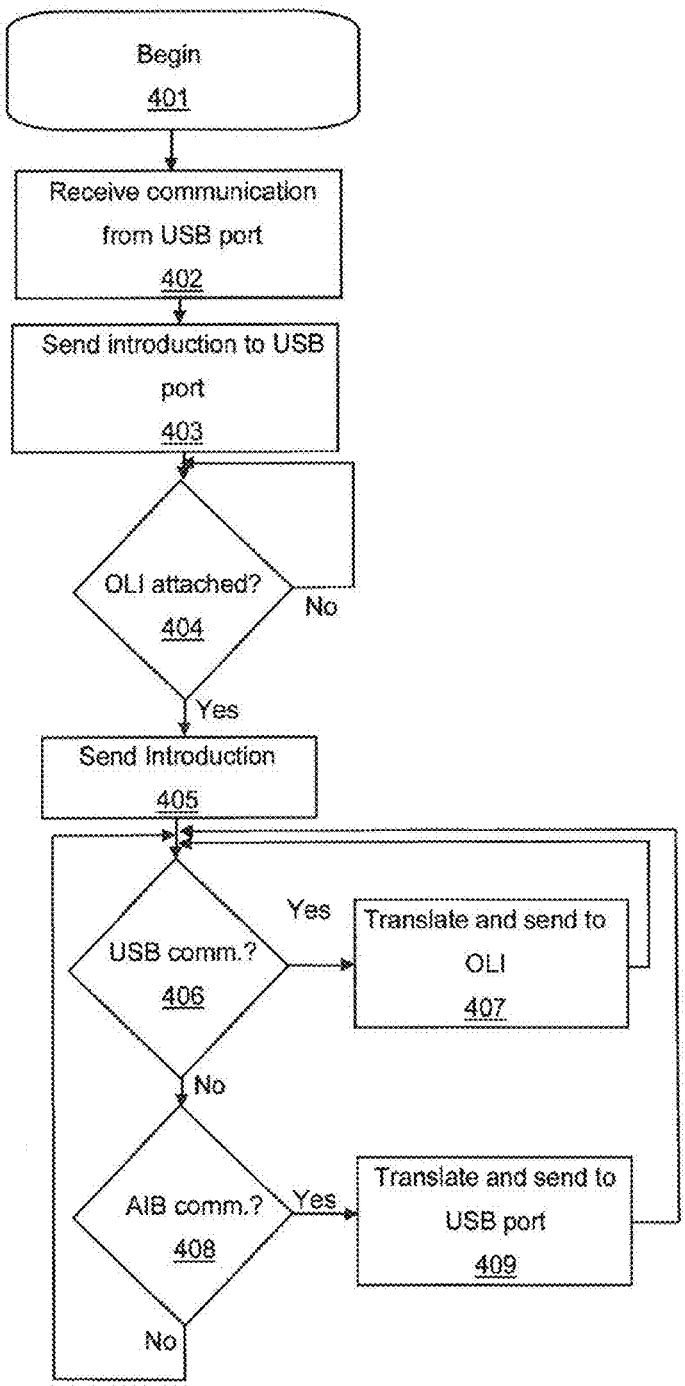
FIG. 4 provides a flowchart 400 that illustrates the steps performed by a dongle adapter, such as the dongle adapter 300 shown in FIG. 3A, according to an embodiment of the invention.

FIG. 4 provides a flowchart 400 that illustrates the steps performed by a dongle adapter, such as the dongle adapter 300 shown in FIG. 3A, according to an embodiment of the invention. The computer system's peripheral device communications protocol discussed in FIG. 4 is the USB protocol for sake of convenience; however, other similar protocols could be used alternatively.

Assume a user has inserted the dongle adapter (e.g., the dongle adapter 300 shown in FIG. 3) into a port on a computer (e.g., the port 206 on the computer 203 shown in FIG. 2). The dongle adapter receives an appropriate introductory communication (step 402) from the computer via the USB port (e.g., the port 206 shown in FIG. 2). The dongle adapter sends an appropriate introductory communication (step 403) to the computer through the USB port, according to an embodiment of the invention.

The dongle adapter checks (step 404) to see if an OLI has been plugged into its OLI jack (e.g., the connection 302 shown in FIG. 3A). If the dongle adapter finds that an OLI has not been plugged into the OLI jack (step 404), then the dongle adapter enters a waiting state and performs the OLI jack check again. If the dongle adapter finds that an OLI has been plugged into the OLI jack (step 404), then the dongle adapter sends (step 405) an appropriate message to the computer, according to an embodiment of the invention. In some embodiments of the invention, the dongle adapter's connection message may cause the computer to provide services (e.g., power) to the OLI.

Once the dongle adapter has been connected to both a computer and an OLI, then if the dongle adapter receives a message in a protocol associated with the computer (step 406), then the dongle adapter translates (step 407) the message into an appropriate protocol for the OLI. The dongle adapter then sends the translated message to the OLI. Conversely, if the dongle adapter receives a message (step 408) in the Auxiliary Interface Bus ("AIB") format of the OLI (e.g., the format used by the PSB), then the dongle adapter translates (step 409) the message into an appropriate protocol for the computer. The dongle adapter then sends the translated message to the computer.

The translator in the dongle adapter may employ the Human Interface Device (HID) Class USB protocol in communications between the computer and the OLI, according to an embodiment of the invention. The translator may convert commands received from the computer formatted in the USB HID protocol into commands and protocols utilized by the AIB protocol, e.g., the PSB. The translator may also convert various status and event messages utilized by the AIB protocol (e.g., the PSB) into HID protocol status and event messages and post these messages to the computer, according to an embodiment of the invention.

The dongle adapter continues its operations until either the computer is powered down or until the dongle adapter is disconnected from the computer and/or the OLI is disconnected from the dongle adapter. For many embodiments, the dongle adapter will not have a power supply of its own and may simply stop operating when the dongle adapter is removed from the computer.

Telephony workstations may have multiple duties (e.g., technical support offices), and include various peripheral devices. These peripheral devices may include a handset lifter that reduces answering the telephone to a single button push (e.g., either on the headset and/or on the computer keyboard). As previously discussed, a workstation is typically equipped with a softphone application that provides telephony features. A suitable softphone may comprise an MS Telephony client and/or a generic softphone application such as Skype. The telephony workstation may even be located in a facility such as a call center that contains many telephony workstations that communicate using the Ethernet, such as the Ethernet 225 shown in FIG. 2. Some corporations even configure their telephony facilities so as to provide communications among offices around the world.

Figure 5:
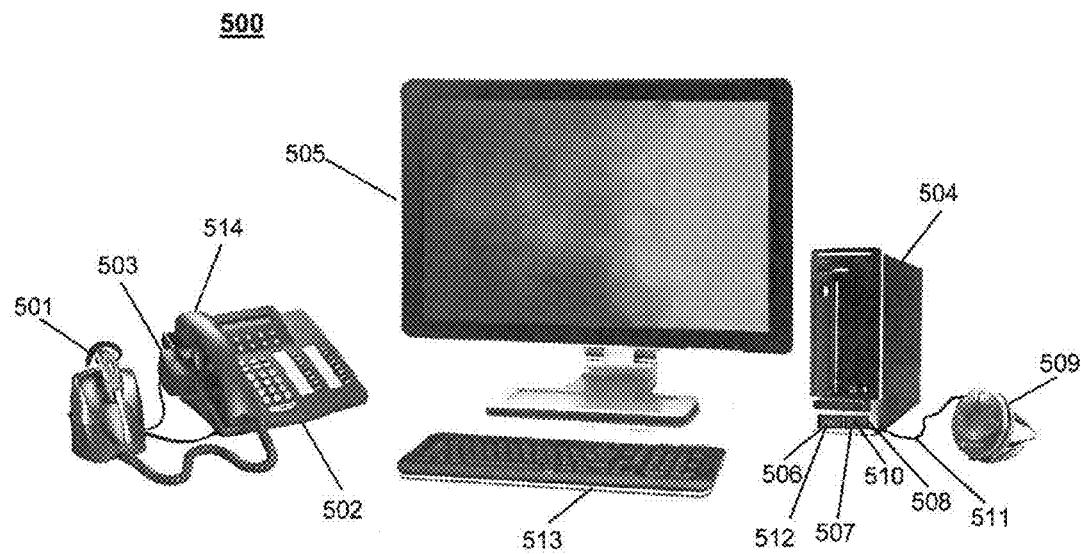
FIG. 5 illustrates a telephony workstation system 500, according to an embodiment of the invention.

FIG. 5 illustrates a telephony workstation system 500, according to an embodiment of the invention. The telephony workstation system 500 comprises a computer 504 configured to have at least two USB ports 506 and 508, according to an embodiment of the invention. The USB port 506 includes a USB device 512 for communications with a headset 501, according to an embodiment of the invention. The headset 501 may be wireless and/or wired. The USB port 508 includes a dongle adapter 507 configured to communicate to an OLI 509, according to an embodiment of the invention. The dongle adapter 507 includes a connection 510 configured to receive a cord 511 from the online indicator 509.

The headset 501 has been configured to operate with a desk phone 502, according to an embodiment of the invention. The phone 502 includes a handset lifter 503. The headset lifter 503 allows the user to answer incoming calls with just the push of a button on either the headset 501 and/or the computer keyboard 513, according to an embodiment of the invention. When the user answers the phone 502, then the lifter 503 raises a handset 514 on the phone 502, making the telephone temporarily unable to receive new phone calls. The headset lifter 503 also works when engaged in softphone calls via the computer 504.

The headset 501 is connected wirelessly to the computer 504. The headset adapter 512 connects to a port 506 (e.g., a port configured for USB communications) on the computer 504 and transmits commands and data between the headset 501 and the computer 504. The computer 504 includes a softphone application (such as the softphone application 604 shown in FIG. 6) that provides telephonic communications over a communications medium, such as an Ethernet, the Internet and/or the wired telephony network (e.g., the communications network 210 shown in FIG. 6). The computer 504 may also include other computing equipment, such as a monitor 505, and other conventional software applications. A suitable softphone application may comprise a specialized or proprietary telephony program and/or a generic softphone application such as Skype. TAPI provides a representative proprietary telephony program.

The telephony workstation system 500 further includes an online indicator ("OLI") 509 configured to indicate when the user's headset 501 is engaged in a phone conversation provided by the softphone application on the computer 504, according to an embodiment of the invention. The OLI 509 lets others know when the user has engaged the headset 501 in a telephone conversation using a softphone application, such as the softphone application 604 shown in FIG. 6. A light on the OLI 509 illuminates when the user has engaged the call and lets others know that the user is occupied with a telephony task.

The OLI 509 may operate according to a conventional design and provide an indication of online status via a number of mechanisms, such as by having lights that become illuminated when the user is on the telephone. The OLI 509 has been designed to receive power and commands via a cord 511 connected to the computer 504. However, the OLI 509 could be designed to operate wirelessly and/or via another power source (e.g., battery power).

The OLI 509 communicates with the headset 501 via a dongle adapter 507, according to an embodiment of the invention. The dongle adapter 507 connects to a port 508 on the computer 504. The port 508 operates according to a communications protocol, such as USB that is different from the communications protocol of the OLI 509. The dongle adapter 507 is also configured to receive the utility cord 511 from the OLI 509, according to an embodiment of the invention. The dongle adapter 507 translates commands formatted for communications via the port 508 (e.g., the USB protocol) into commands associated with the protocol of the OLI 509, such as an AIB, which may be a proprietary protocol like the PSB. Similarly, the dongle adapter 507 also translates commands formatted in the communications protocol employed by the OLI 509 into commands formatted according to the communications protocol used by the port 508. Thus, the OLI 509 itself may be of a conventional design that communicates only via a proprietary protocol yet still sends and receives communications via the computer 504 because of the presence of the dongle adapter 507, according to an embodiment of the invention. The dongle adapter 507 may be configured for operations with accessory devices beyond the OLI 509, according to an alternative embodiment of the invention.

Figure 6:
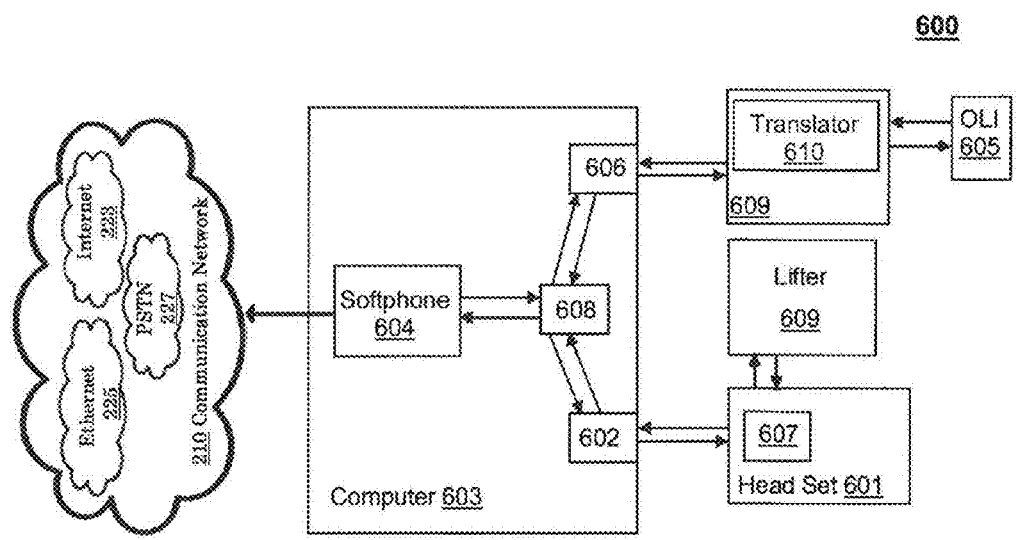
FIG. 6 illustrates a telephony workstation system 600, according to an embodiment of the invention.

FIG. 6 illustrates a telephony workstation system 600, according to an embodiment of the invention. The telephony workstation system 600 comprises a computer 603 having a softphone application 604, according to an embodiment of the invention. The software application 604 provides telephonic communications in the communication system 600 over a communication network 210, such as the Internet 223, the PSTN 227, and/or the Ethernet 225.

The softphone application 604 has been configured to communicate via a bus 608 configured for communications via a protocol such as USB. Using the bus 608, the softphone 604 may send communications to an online indicator 605 and a headset 601, according to an embodiment of the invention. The headset 601 may communicate directly to a lifter 609 using an AIB communications protocol, such as PSB.

The headset 601 may similarly communicate to the online indicator 605 using the AIB protocol; however, the headset 601 first needs to translate the command from the AIB protocol to a universal protocol such as USB. Thus, the headset 601 formulates communications with a port 602 that provides communications according to a conventional protocol such as USB. Once the communication has been received at the port 602, it may be transmitted to the softphone application 604 and/or it may be communicated to the online indicator 605, according an embodiment of the invention. The communication to the online indicator 605 needs to be translated from the USB protocol into the AIB protocol. The dongle adapter 609 includes a translator 610 that provides the translation from one protocol to another.

The translator 610 may employ the Human Interface Device (HID) Class USB protocol in communications between the computer 603 and the OLI 605, according to an embodiment of the invention. The translator 610 may convert commands received via the port 606 from the computer 603 formatted in the USB HID protocol into commands and protocols utilized by the AIB protocol, e.g., the PSB. The translator 610 may also convert various status and event messages utilized by the AIB protocol (e.g., the PSB) into HID protocol status and event messages and post these messages to the computer 603 via the port 606, according to an embodiment of the invention.

The softphone application 604 sends and receives communications that travel along a computer bus 608 and some of these communications may be routed through the ports 602 and 606. As shown in FIG. 6, the port 602 is associated with the headset 601, and the port 606 is associated with a dongle adapter 609, according to an embodiment of the invention. The bus 608 operates as a conventional computer bus, and the protocols associated with the ports 602 and 606 are compatible with the computer's busing protocol, e.g., the ports 602 and 606 are configured to operate according to the USB protocol. Additional communications beyond those of the software application 604 may transpire over the bus 608 and may involve the ports 602 and 606, as appropriate. For example, the headset 601 may send communications that provide the headset 601 with a source of power, according to an embodiment of the invention. The dongle adapter 609 may also be configured to request power from the computer 603 via the bus 608 for the adapter's own operations and/or for an OLI 605.

The telephony workstation system 600 includes the headset 601 that may communicate with the softphone application 604, such as when the user is engaged in a phone conversation. The headset 601 communicates through the port 602 using a conventional protocol (e.g., USB). The headset 601 may operate internally in an AIB protocol, which may be proprietary. As shown in FIG. 6, a translator 607 may accept internal communications from the headset 601 and translate them into a protocol acceptable for transmission through the port 602, according to an embodiment of the invention. The translator is likely not needed if the headset 601 has been designed to communicate according to the same protocol as the port 602. Whether the headset 601 includes a translator (e.g., the translator 607), the headset 601 communicates with the softphone application 604 via the port 602, according to an embodiment of the invention.

The workstation system 600 includes the OLI 605. The OLI 605 may be of a conventional design, and the OLI 605 may be configured only for communications in an AIB protocol (e.g., the PSB). A dongle adapter 609 includes a translator 610 configured to accept commands formatted in the AIB protocol of the OLI 605 and translate them into a communications protocol suitable for transmission to the port 606 (e.g., the USB protocol), according to an embodiment of the invention.

Using the telephony workstation system 600, a communication could originate from the headset 601 in the AIB protocol, be translated into the USB language by the translator 607 and sent to the computer 603 where it ultimately is received by the dongle adapter 609 and translated by the translator 611 back into the AIB protocol, according to an embodiment of the invention. Similarly, messages could be communicated through the softphone 604 to the OLI 605 and vice versa.

In the workstation system 600, for example, a message could be transmitted from the headset 601—or from the softphone 604—that the user was engaged in a phone conversation and accordingly, a light in the OLI 605 should be illuminated (e.g., the light 110 shown in FIG. 1), according to an embodiment of the invention. One exemplary communications sequence would have a call-related signal going from the softphone 604 to the headset 601 via the bus 608 and the port 602 and then having the headset 601 send a signal via the port 602, the bus 604, and the port 606 to the dongle 609 that instructed the OLI 605 to turn on its light.

The OLI 605 may not typically be configured to light automatically when audio is provided to the headset 601 from a non-telephonic source, such as streaming media, according to an embodiment of the invention. The OLI 605 could be configured for manual lighting in such non-telephonic situations, according to an embodiment of the invention. The manual lighting could be engaged externally to the OLI 605, such as from the headset 601, according to an embodiment of the invention.

The translator used in various embodiments of the invention may be comprised of software and/or hardware. For example, the translator may be comprised of a memory device, such as PROM configured to include all the mappings from the proprietary language to the USB protocol and vice versa.

While specific embodiments of the invention have been illustrated and described, it will be clear that the invention is not limited to these embodiments only. Embodiments of the invention discussed herein have generally been described using Plantronics equipment (e.g., headsets and OLIs); however, the invention may be adapted for use with equipment from other sources and manufacturers. Headsets used in conjunction with the invention may be configured to operate according to a conventional computer protocol (e.g., USB) and/or may be configured to operate according to a specialized protocol (e.g., a Plantronics serial bus) and communicate to the computer using a specialized interface, similar to the translator provided here for the OLI. Similarly, a single dongle adapter could be employed for multiple devices operating in a computerized system but using an AIB, such as PSB. Apart from an additional routing configuration, such a multiple device dongle adapter would need to have a translator (or multiple translators) that could translate commands for all the proprietary devices to which the dongle adapter could be connected. Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification, but should be construed to include all systems and methods that operate under the claims set forth hereinbelow. Thus, it is intended that the invention covers the modifications and variations of this invention provided they come within the scope of the appended claims and their equivalents.

We claim:

1. A dongle adapter, comprising:
    a first port configured for communications using a first communications protocol, wherein the first port is attached to a computing device configured for communications according to the first communications protocol;
    a second port configured for communications using a second communications protocol, wherein the second port is attached to an online indicator ("OLI") configured for communications according to the second communications protocol, wherein the OLI operates under control of the computing device and wherein the OLI includes a light that when illuminated indicates that a user associated with the OLI is engaged in conversation; and
    a translator configured to receive commands from the computing device formatted according to the first communications protocol, translate the received commands into the second communications protocol and send the translated commands to the OLI, and wherein the translator is further configured to translate commands received from the OLI formatted according to the second communications protocol, translate the received commands into the first communications protocol, and send the translated commands to the computing device.

2. The dongle adapter of claim 1 wherein the dongle adapter further comprises a first port configured for connection to the computing device in accordance with a connection type associated with the first communications protocol.

3. The dongle adapter of claim 2 wherein the first communications protocol comprises the Universal Serial Bus ("USB") protocol and the first port is configured for connection with a USB receptacle on the computing device and wherein the translator is configured to translate commands from the second communications protocol into commands formatted according to the USB protocol.

4. The dongle adapter of claim 3 wherein the translator receives a command from the computing device in the first communications protocol instructing the OLI to illuminate the light organic to the OLI and wherein the translator translates the command from the first communications protocol into the second communications protocol and sends the translated command to the OLI for execution.

5. The dongle adapter of claim 4 wherein the computing device is connected to a headset and wherein the command to illuminate the OLI's organic light originated with the headset and passes through the computing device to the dongle adapter.

6. The dongle adapter of claim 1 wherein the dongle adapter comprises a second port configured for connection to the OLI.

7. The dongle adapter of claim 6 wherein the second communications protocol comprises an Auxiliary Interface Bus ("AIB") protocol and the second port is configured for receiving communications formulated for the AIB protocol associated with the OLI, and wherein the translator is configured to translate commands from the first communications protocol into commands formatted according to the AIB protocol.

8. The dongle adapter of claim 7 wherein the second port is configured to receive a jack associated with the OLI and wherein the translator receives a command from the OLI in the second communications protocol that acknowledges an instruction to illuminate a light organic to the OLI and wherein the translator translates the received command from the AIB protocol to the first communications protocol and sends the translated command to the computing device for execution.

9. The dongle adapter of claim 8 wherein the computing device is also attached to a headset and wherein the computing device sends the translated command to the headset for execution.

10. The dongle adapter of claim 9 wherein the headset and the OLI internally communicate according to the AIB protocol.

11. A method of operating a dongle adapter, comprising:
    configuring a first port on the dongle adapter for communications using a first communications protocol, wherein the first port is attached to a computing device configured for communications according to the first communications protocol;
    configuring a second port on the dongle adapter for communications using a second communications protocol, wherein the second port is attached to an online indicator ("OLI") configured for communications according to the second communications protocol and wherein the OLI operates under control of the computing device;
    receiving commands in a translator associated with the dongle adapter from the computing device formatted according to the first communications protocol, translating the commands by the translator into the second communications protocol and sending the translated commands to the OLI; and
    receiving commands in the translator from the OLI formatted according to the second communications protocol, translating the commands into the first communications protocol, and sending the translated commands to the computing device.

12. The method of claim 11, further comprising configuring a first port on the dongle adapter for connection and communication with the computing device in accordance with the first communications protocol.

13. The method of claim 12 wherein the first communications protocol comprises the Universal Serial Bus ("USB") protocol, the method further comprising configuring the first port for coupling with a USB receptacle on the computing device and translating commands by the translator from the second communications protocol into commands formatted according to the USB protocol.

14. The method of claim 13, the method further comprising:
    receiving commands from the computing device in the first communications protocol;
    translating the received commands the translator into the second communications protocol; and
    sending the translated command to the OLI for execution, wherein the received command from the computing device instructs the OLI to illuminate a light organic to the OLI.

15. The method of claim 14 wherein the computing device is connected to a headset and wherein the command to illuminate the OLI's organic light originated with the headset and passed through the computing device.

16. The method of claim 15 wherein the dongle adapter comprises a second port configured for connection to the OLI, and wherein the method further comprises configuring the second port of connection to the OLI and communication with the second communications protocol.

17. The method of claim 16 wherein the second communications protocol comprises an Auxiliary Interface Bus ("AIB") protocol, the method further comprising configuring the second port for coupling with an AIB receptacle associated with the OLI and configuring the translator to translate commands from the second communications protocol into commands formatted according to the AIB protocol.

18. The method of claim 17, the method further comprising configuring the second port to receive a jack associated with the OLI, the method further comprising:
   receiving by the translator a command from the OLI in the second communications protocol acknowledging an instruction to illuminate a light organic to the OLI,
   translating by the translator the received command from the AIB protocol to the first communications protocol; and
   sending the translated command to the computing device for execution.

19. The method of claim 18 wherein the computing device is also attached to a headset and wherein the computing device sends the translated command to the headset for execution.

20. The method of claim 19 wherein the headset and the OLI internally communicate according to the AIB protocol.

* * * * *